United States Patent [19]
Copeland

[11] 3,900,224
[45] Aug. 19, 1975

[54] BOOT

[76] Inventor: Andrew P. Copeland, 3339 E. Avenue S, Palmdale, Calif. 93550

[22] Filed: Jan. 23, 1974

[21] Appl. No.: 435,752

[52] U.S. Cl. ............................ 296/23 MC; 52/208
[51] Int. Cl. ............................................. B60p 3/32
[58] Field of Search ........ 296/23 MC, 23 R; 52/208

[56] References Cited
UNITED STATES PATENTS

| | | | |
|---|---|---|---|
| 2,889,171 | 6/1959 | Morris | 296/100 |
| 3,321,233 | 5/1967 | Davis | 296/23 MC |
| 3,625,560 | 12/1971 | Bjork | 296/23 MC |
| 3,638,991 | 7/1970 | Hathaway, Jr. | 296/23 MC |

*Primary Examiner*—Robert J. Spar
*Assistant Examiner*—Donald W. Underwood
*Attorney, Agent, or Firm*—Christie, Parker & Hale

[57] ABSTRACT

A boot for a cab-and-camper recreational vehicle is arranged to facilitate installation. The boot includes a sleeve for defining an air corridor in the spacing between facing open windows of the cab and the camper. A first frame has one end of the sleeve substantially permanently secured to it and is installed in abutting relationship with one of the windows on its interior facing side. A second frame is installed in abutting relationship with the other window on its interior facing side. The sleeve, during installation, is pulled taut and its free end is fastened to the second frame so that the sleeve, being in tension, exerts a pull on each frame thereby holding them flush against the respective windows.

7 Claims, 3 Drawing Figures

PATENTED AUG 19 1975  3,900,224

BOOT

BACKGROUND OF THE INVENTION

This invention relates to boots of the type used to provide an air corridor in the spacing between open facing windows of a cab of a vehicle and a recreational housing accessory mounted on the vehicle.

In recent years there have been used various types of recreational vehicles such as the type in which a housing accessory, typically called a camper, is mounted on a truck in its load-carrying area behind its cab. So that objects can be passed between the cab and the camper, it is common to provide the cab and camper with facing windows of the sliding glass type. Between the facing windows there is a spacing of generally somewhat less than a foot. Boots have been used to provide an air corridor or passageway in this spacing.

One of the overall purposes of a boot is to act as an air flow duct. With such an air flow duct, a heater and air conditioner for heating and cooling the cab can be used for heating and cooling the camper as well. For this reason, it is preferable that the boot be sealed tight and provide heat insulation. Another purpose is to facilitate having a conversation between one person in the cab and another in the camper. To this end also it is preferable that the boot be sealed tight and provide insulation so that road noise will not disturb the occupants.

In addition to the foregoing, it is advantageous to have a boot that is easily installed and removed. In a truck/camper combination, ease of removal is particularly important because often the owner of the truck uses it for hauling and the like as well as for recreational purposes and therefore frequently removes the camper from the truck. Many of the boot arrangements that have been proposed do not meet this need. Generally such boots have been substantially permanently affixed in place. Moreover, the known boot arrangements usually involve special fittings that must be affixed to the interior surfaces of the cab and camper. Removal of such special fittings of course usually exposes unattractive screw-holes and the like.

Another prior art arrangement, directed to boot installation, is disclosed in U.S. Pat. No. 3,321,234. This arrangement involves the use of a special slidable window and a mating boot that are clamped or clipped together.

SUMMARY OF THE INVENTION

This invention is directed to a boot and provides an arrangement that facilitates installation and removal of the boot.

The boot provides an air corridor in the spacing between facing open windows of a cab of a vehicle and a recreational housing accessory mounted to the vehicle. The boot includes a first frame and a sleeve having one end permanently secured to the first frame. Upon installation, the first frame abuts an interior facing side of one of the windows and the sleeve extends across the spacing and through the other window. Preferably, the sleeve is fabricated from a layer of flexible polyurethane foam. Each opposite side of the foam layer is covered with a vinyl-coated fabric. Among other things, this fabrication enhances sound deadening and heat insulating properties of the boot.

The boot further comprises a second frame that is positioned to abut the other window on its interior facing side. Advantageously, the first and second frames each have a resilient layer of material such as polyurethane foam secured to a rigid frame defining member. The boot further comprises means for releasably fastening the other end of the sleeve to the second frame with the sleeve pulled taut so that the sleeve, being in tension, exerts a pull on each frame thereby holding them flush against the respective windows.

DETAILED DESCRIPTION

Figure 1:
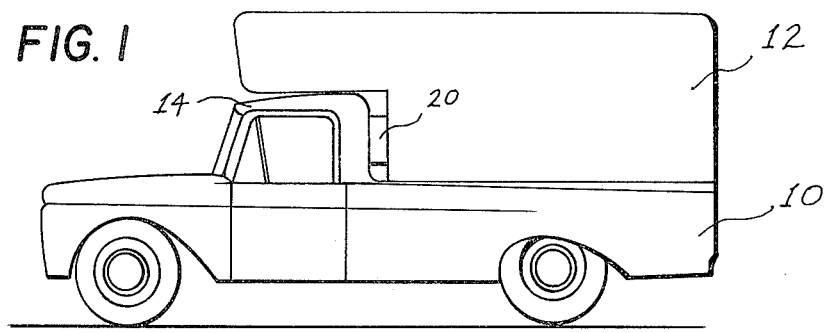
FIG. 1 is a sketch illustrating a typical cab-and-camper type recreational vehicle in which a boot according to this invention is installed.

In FIG. 1, there is shown a truck 10 having a load-carrying area on which there is mounted a recreational housing accessory or camper 12 behind the cab 14 of the truck. The cab and the camper are provided with the conventional facing windows of the sliding panel type. Between the facing windows, there is seen the sleeve portion 20 of the boot of this invention.

The sleeve defines an air corridor or passageway in the spacing between the open, facing windows. Owing to this air corridor, a heater and air conditioner for heating and cooling the cab can be used for heating and cooling the camper as well. For this reason, the boot of this invention is adapted to be sealed tight upon installation and provide heat insulation.

Figure 2:
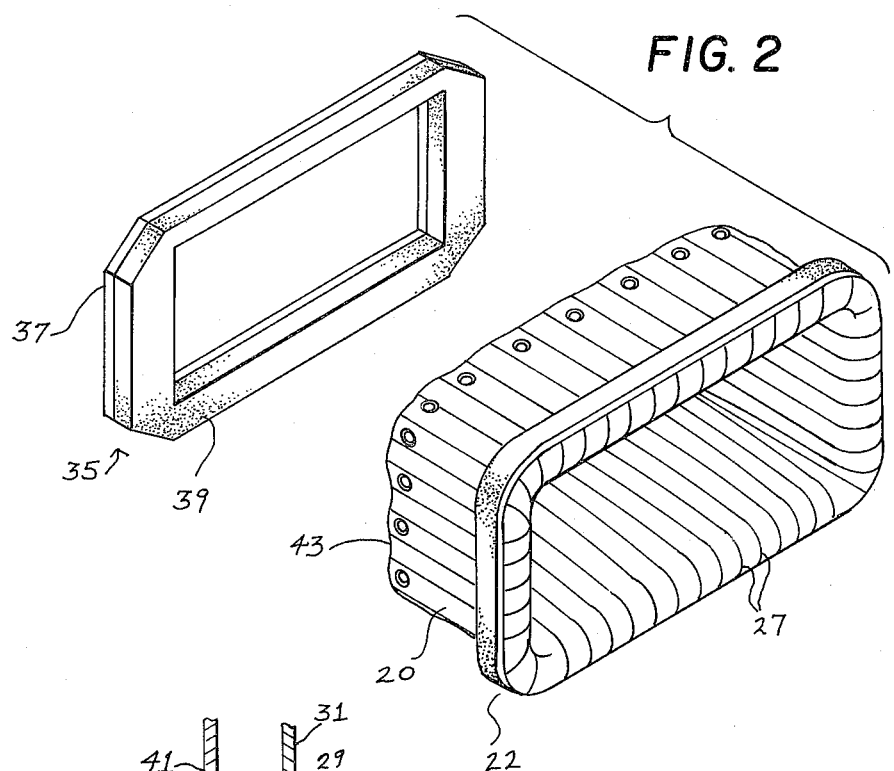
FIG. 2 is a perspective, exploded view of the preferred construction of the boot of this invention.
Figure 3:
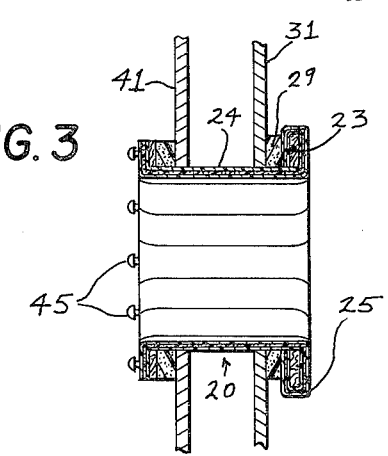
FIG. 3 is a cross-sectional view illustrating the boot as installed.

As shown in FIGS. 2 and 3, the boot includes a first frame indicated generally at 22. The frame includes a core or frame defining member 23 that is preferably made of wood. The sleeve 20 has one of its ends substantially permanently secured to the frame defining member 23 as by staples or the like. The sleeve is preferably fabricated to include a layer 24 of flexible polyurethane foam. Each opposite surface of the layer 24 is covered with a vinyl-coated fabric layer 25. Preferably, the fabric layers are secured to the foam layer by seams 27 of stitches. Among other things, this fabrication enhances the sound deadening and heat insulating properties of the boot. Advantageously, the frame 22 further includes a resilient layer 29 such as polyurethane foam that is affixed to the core by glue or the like.

As best shown in FIG. 3, the first frame upon installation abuts an interior facing surface 31 of one of the two open facing windows. The sleeve 20 extends across the spacing between the cab and the camper, typically a distance of somewhat less than a foot.

The boot further includes a second frame 35 which, like the first frame, includes a wood core or frame defining member. Preferably, to enhance its appearance, one face of this frame defining member is covered with a layer 37 of vinyl-coated fabric identical to that used in the sleeve. Also, the opposite face of the frame defining member has secured to it a resilient layer 39 such as polyurethane foam. As best shown in FIG. 3, the second frame upon installation abuts an interior facing surface 41 of the other open window.

To provide a means for releasably fastening the free end 43 of the sleeve to the second frame, there are provided near this free end a plurality of spaced-apart metal eyelets. Also, a corresponding plurality of catches 45 are provided on the interior facing surface of the second frame. In the presently preferred embodiment, each of these catches is a wood screw that is driven into the wood frame defining member and over whose head a respective one of the metal eyelets slips.

Each of the screws is positioned at a spaced-apart point along the boundary of an imaginary rectangle. The area of this imaginary rectangle is related to the spacing between the cab and the camper. Thus, for a relatively longer spacing, the area is made larger. Inasmuch as there is no exact standard for the spacing, it is preferable that the screws not be driven until the user first installs the boot in his particular vehicle.

During installation of the boot, the sleeve is pulled taut so that each of the eyelets slips over the head of the screw with which it registers. Thereafter, the sleeve, being in tension, exerts a pull on each frame thereby holding them flush against the respective windows.

The overall arrangement of the boot is advantageous because, among other things, there is no need to use mounting hardware and the like to install it. It is easily installed or removed in a matter of minutes without the need for using screwdrivers or other tools. Its vinyl-coated fabric exterior gives it an attractive appearance. The snug fit it makes against the interior facing windows causes no abrasion of the interior because of the relative softness of the foam layers of the frames.

I claim:

1. A boot for providing an air corridor in the spacing between facing open windows of a cab of a vehicle and a recreational housing accessory mounted to the vehicle, the boot comprising:
a first frame;
a sleeve having one end substantially permanently secured to the first frame, the first frame and the sleeve being adapted for installation so that the first frame abuts an interior facing side of one of the windows and the sleeve extends across said spacing and through the other window;
a second frame positionable to abut the other window on its interior facing side; and
means for releasably fastening the other end of the sleeve to the second frame, said means including first fastening means located on the second frame and second fastening means located on the sleeve so as to be engageable with the first fastening means only when the sleeve is pulled taut, the sleeve being held in the tension upon engagement of the first and second fastening means so as to exert a pull on each frame thereby holding them flush against the respective windows.

2. A boot according to claim 1 wherein each frame includes a frame defining member having a foam layer secured to its window-abutting surface.

3. A boot according to claim 1 wherein the sleeve is fabricated to include a flexible foam layer.

4. A boot according to claim 3 wherein the flexible foam layer is flexible polyurethane foam.

5. A boot according to claim 1 wherein the second fastening means includes a plurality of eyelets arranged near the free end of the sleeve and the first fastening means includes a corresponding plurality of catches over each of which a respective one of the eyelets slips when the sleeve is pulled taut to thereafter engage the respective eyelet.

6. A boot according to claim 1 wherein each frame includes a frame defining member having a foam layer secured to its window-abutting surface; and the sleeve is fabricated to include a layer of flexible polyurethane foam.

7. A boot according to claim 6 wherein each opposite surface of the polyurethane foam layer is covered with a vinyl-coated fabric.

* * * * *